(12) United States Patent
Kaufman et al.

(10) Patent No.: US 9,406,036 B2
(45) Date of Patent: Aug. 2, 2016

(54) DISCRETE ENERGY ASSIGNMENTS FOR MANUFACTURING SPECIFICATIONS

(75) Inventors: Philip John Kaufman, Milwaukee, WI (US); Marcia Elaine Walker, Durham, NC (US); Steven Anthony Lombardi, Whitewater, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 2189 days.

(21) Appl. No.: 12/429,821

(22) Filed: Apr. 24, 2009

(65) Prior Publication Data

US 2010/0274377 A1    Oct. 28, 2010

(51) Int. Cl.
  *G06F 19/00*    (2011.01)
  *G06Q 10/06*    (2012.01)

(52) U.S. Cl.
  CPC .................................... *G06Q 10/06* (2013.01)

(58) Field of Classification Search
  None
  See application file for complete search history.

(56) References Cited

U.S. PATENT DOCUMENTS

| | | |
|---|---|---|
| 4,039,392 A | 8/1977 | Singh |
| 4,300,125 A | 11/1981 | Loshing et al. |
| 4,341,345 A | 7/1982 | Hammer et al. |
| 4,383,298 A | 5/1983 | Huff et al. |
| 4,624,685 A | 11/1986 | Lueckenotte et al. |
| 4,827,395 A | 5/1989 | Anders et al. |
| 5,043,929 A | 8/1991 | Kramer et al. |
| 5,202,996 A | 4/1993 | Sugino et al. |
| 5,251,205 A | 10/1993 | Callon et al. |
| 5,297,057 A | 3/1994 | Kramer et al. |
| 5,646,862 A | 7/1997 | Jolliffe et al. |
| 5,736,983 A | 4/1998 | Nakajima et al. |
| 5,822,207 A | 10/1998 | Hazama et al. |
| 5,924,486 A | 7/1999 | Ehlers et al. |
| 5,983,622 A | 11/1999 | Newburry et al. |
| 6,012,053 A | 1/2000 | Pant et al. |
| 6,015,783 A | 1/2000 | von der Osten et al. |
| 6,076,108 A | 6/2000 | Courts et al. |
| 6,263,255 B1 | 7/2001 | Tan et al. |
| 6,281,784 B1 | 8/2001 | Redgate et al. |
| 6,289,252 B1 | 9/2001 | Wilson et al. |
| 6,321,983 B1 | 11/2001 | Katayanagi et al. |
| 6,473,893 B1 | 10/2002 | Kay et al. |
| 6,507,774 B1 | 1/2003 | Reifman et al. |

(Continued)

FOREIGN PATENT DOCUMENTS

| | | |
|---|---|---|
| EP | 0977137 A2 | 2/2000 |
| WO | 2004074954 A2 | 9/2004 |
| WO | 2008011427 A2 | 1/2008 |

OTHER PUBLICATIONS

European Search Report dated Nov. 4, 2010 for European Patent Application No. EP 10 16 0737, 9 pages.

(Continued)

*Primary Examiner* — Mohammad Ali
*Assistant Examiner* — Sheela S Rao
(74) *Attorney, Agent, or Firm* — Fletcher Yoder, P.C.

(57) ABSTRACT

An industrial control system is provided. The system includes tagged data that is collected from a plurality of sustainability factor-associated data sources across an industrial automation environment, where the tagged data is associated with a portion of a process that is attributed to the sustainability factor data sources. A manufacturing model is associated with the tagged data, where the manufacturing model is employed to enhance the efficiencies of the process.

24 Claims, 10 Drawing Sheets

(56) References Cited

U.S. PATENT DOCUMENTS

| | | | |
|---|---|---|---|
| 6,633,823 | B2 | 10/2003 | Bartone et al. |
| 6,701,298 | B1 | 3/2004 | Jutsen |
| 6,732,055 | B2 | 5/2004 | Bagepalli et al. |
| 6,747,368 | B2 | 6/2004 | Jarrett, Jr. |
| 6,785,592 | B1 | 8/2004 | Smith et al. |
| 6,857,020 | B1 | 2/2005 | Chaar et al. |
| 6,859,755 | B2 | 2/2005 | Eryurek et al. |
| 7,043,316 | B2 | 5/2006 | Farchmin et al. |
| 7,274,975 | B2 | 9/2007 | Miller |
| 7,277,864 | B2 | 10/2007 | Ohnemus et al. |
| 7,409,303 | B2 | 8/2008 | Yeo et al. |
| 7,451,019 | B2 | 11/2008 | Rodgers |
| 7,477,956 | B2 | 1/2009 | Huang et al. |
| 7,531,254 | B2 | 5/2009 | Hibbs et al. |
| 7,565,351 | B1 | 7/2009 | Callaghan |
| 7,587,251 | B2 | 9/2009 | Hopsecger |
| 7,747,416 | B2 | 6/2010 | Deininger et al. |
| 7,788,189 | B2 | 8/2010 | Budike, Jr. |
| 8,068,938 | B2 | 11/2011 | Fujita |
| 8,271,363 | B2 | 9/2012 | Branscomb |
| 2001/0011368 | A1 | 8/2001 | Graser et al. |
| 2002/0013744 | A1 | 1/2002 | Tsunenari et al. |
| 2002/0026343 | A1 | 2/2002 | Duenke |
| 2002/0066072 | A1 | 5/2002 | Crevatin |
| 2002/0099464 | A1 | 7/2002 | O'Connor et al. |
| 2002/0099804 | A1 | 7/2002 | O'Connor et al. |
| 2002/0116239 | A1 | 8/2002 | Reinsma et al. |
| 2002/0128933 | A1 | 9/2002 | Day et al. |
| 2002/0168621 | A1 | 11/2002 | Cook et al. |
| 2002/0169582 | A1 | 11/2002 | Eryurek et al. |
| 2002/0178047 | A1 | 11/2002 | Or et al. |
| 2002/0198755 | A1 | 12/2002 | Birkner et al. |
| 2003/0014500 | A1 | 1/2003 | Schleiss et al. |
| 2003/0028527 | A1 | 2/2003 | Crosby et al. |
| 2003/0061091 | A1 | 3/2003 | Amaratunga et al. |
| 2003/0088370 | A1 | 5/2003 | Bagepalli et al. |
| 2003/0110065 | A1 | 6/2003 | Twigge-Molecey |
| 2003/0110369 | A1 | 6/2003 | Fish et al. |
| 2003/0171851 | A1 | 9/2003 | Brickfield et al. |
| 2003/0221119 | A1 | 11/2003 | Geiger et al. |
| 2004/0088119 | A1 | 5/2004 | Landgraf |
| 2004/0107345 | A1 | 6/2004 | Brandt et al. |
| 2004/0117240 | A1 | 6/2004 | Ness et al. |
| 2004/0143467 | A1 | 7/2004 | McAllister et al. |
| 2004/0158506 | A1 | 8/2004 | Wille |
| 2004/0199294 | A1 | 10/2004 | Fairlie et al. |
| 2004/0205412 | A1 | 10/2004 | Staron et al. |
| 2004/0249697 | A1 | 12/2004 | Ohnemus et al. |
| 2004/0260489 | A1 | 12/2004 | Mansingh et al. |
| 2004/0261673 | A1 | 12/2004 | Allen et al. |
| 2005/0015287 | A1 | 1/2005 | Beaver |
| 2005/0034023 | A1 | 2/2005 | Maturana et al. |
| 2005/0065971 | A1 | 3/2005 | Honda |
| 2005/0143865 | A1 | 6/2005 | Gardner |
| 2005/0144154 | A1* | 6/2005 | DeMesa et al. .................. 707/1 |
| 2005/0171910 | A1 | 8/2005 | Wu et al. |
| 2005/0198241 | A1 | 9/2005 | Pavlik et al. |
| 2005/0198333 | A1 | 9/2005 | Dinges et al. |
| 2005/0234904 | A1 | 10/2005 | Brill et al. |
| 2005/0278296 | A1 | 12/2005 | Bostwick |
| 2006/0026145 | A1 | 2/2006 | Beringer et al. |
| 2006/0248002 | A1 | 11/2006 | Summer et al. |
| 2007/0038646 | A1 | 2/2007 | Thota |
| 2007/0073750 | A1 | 3/2007 | Chand et al. |
| 2007/0078736 | A1 | 4/2007 | Chand et al. |
| 2007/0168213 | A1 | 7/2007 | Comrie |
| 2007/0226068 | A1 | 9/2007 | Keil et al. |
| 2007/0283030 | A1 | 12/2007 | Deininger et al. |
| 2008/0015975 | A1 | 1/2008 | Ivchenko et al. |
| 2008/0046387 | A1 | 2/2008 | Gopal et al. |
| 2008/0046407 | A1 | 2/2008 | Shah et al. |
| 2008/0059457 | A1 | 3/2008 | Ohnemus et al. |
| 2008/0079560 | A1 | 4/2008 | Hall et al. |
| 2008/0127779 | A1 | 6/2008 | Morales Cerda et al. |
| 2008/0154749 | A1 | 6/2008 | D'hooghe et al. |
| 2008/0255889 | A1 | 10/2008 | Geisler et al. |
| 2008/0255899 | A1 | 10/2008 | McConnell et al. |
| 2008/0270272 | A1 | 10/2008 | Branscomb |
| 2008/0272934 | A1 | 11/2008 | Wang et al. |
| 2008/0319812 | A1 | 12/2008 | Sousa et al. |
| 2009/0083843 | A1 | 3/2009 | Wilkinson, Jr. et al. |
| 2009/0099887 | A1 | 4/2009 | Sklar et al. |
| 2009/0100159 | A1 | 4/2009 | Extra |
| 2009/0132176 | A1 | 5/2009 | McConnell et al. |
| 2009/0138415 | A1 | 5/2009 | Lancaster |
| 2009/0177505 | A1 | 7/2009 | Dietrich et al. |
| 2009/0222307 | A1 | 9/2009 | Beaver |
| 2009/0281674 | A1 | 11/2009 | Taft |
| 2009/0281677 | A1 | 11/2009 | Botich et al. |
| 2009/0313164 | A1 | 12/2009 | Hoglund |
| 2009/0319315 | A1 | 12/2009 | Branscomb |
| 2010/0023360 | A1 | 1/2010 | Nadhan |
| 2010/0030601 | A1 | 2/2010 | Warther et al. |
| 2010/0042455 | A1 | 2/2010 | Liu et al. |
| 2010/0057480 | A1 | 3/2010 | Arfin et al. |
| 2010/0088136 | A1 | 4/2010 | Cheng et al. |
| 2010/0100405 | A1 | 4/2010 | Lepore et al. |
| 2010/0131343 | A1 | 5/2010 | Hamilton |
| 2010/0138003 | A1 | 6/2010 | August et al. |
| 2010/0217642 | A1 | 8/2010 | Crabtree et al. |
| 2010/0217651 | A1 | 8/2010 | Crabtree et al. |
| 2010/0218108 | A1 | 8/2010 | Crabtree et al. |
| 2010/0249975 | A1 | 9/2010 | Rezayat |
| 2010/0262445 | A1 | 10/2010 | DeSorbo |
| 2010/0274367 | A1 | 10/2010 | Kaufman et al. |
| 2010/0274602 | A1 | 10/2010 | Kaufman et al. |
| 2010/0274603 | A1 | 10/2010 | Walker et al. |
| 2010/0274611 | A1 | 10/2010 | Kaufman et al. |
| 2010/0274612 | A1 | 10/2010 | Walker et al. |
| 2010/0274629 | A1 | 10/2010 | Walker et al. |
| 2010/0274810 | A1 | 10/2010 | Walker et al. |
| 2010/0275147 | A1 | 10/2010 | Kaufman et al. |
| 2010/0292856 | A1 | 11/2010 | Fujita |
| 2010/0314940 | A1 | 12/2010 | Palmer et al. |
| 2010/0318233 | A1 | 12/2010 | Yunes et al. |
| 2010/0332373 | A1 | 12/2010 | Crabtree et al. |
| 2011/0046800 | A1 | 2/2011 | Imes et al. |
| 2011/0071721 | A1 | 3/2011 | Gilfillan et al. |
| 2011/0172838 | A1 | 7/2011 | Pai et al. |
| 2011/0273022 | A1 | 11/2011 | Dennis et al. |

OTHER PUBLICATIONS

European Search Report completed Aug. 6, 2010 for European Patent Application No. EP 10 16 0810, 2 pages.

EPO : Notice from the European patent Office dated Oct. 1, 2007 concerning business methods. Official Journal of the European Patent Office, vol. 30, No. 11, Nov. 1, 2007, pp. 592-593.

European Search Report for European Application No. 10160585.5-1527 / 2254061 datedDec. 20, 2010, 9 pages.

OA dated Feb. 16, 2011 for U.S. Appl. No. 12/429,813, 21 pages.

GE Energy. "Energy and Asset Performance—Fact Sheet." Sep. 2005. General Electric Company. Published online at [http://www.gepower.com/prod_serv/serv/industrial_service/en/downloads/gea14163_eap.pdf], retrieved Apr. 13, 2009. 2 pages.

Abb. "Energy Management Solution for the Process Industry—Energy Management and Optimization." Apr. 6, 2007. Published online at [http://library.abb.com/global/scot/scot313.nsf/veritydisplay/5e48etb88a7e1cbac125734600737b02/$File/3BFI405000R4001_en_Energy_Management_and_Optimization_3.5.pdf], retrieved Apr. 13, 2009. 12 pages.

Abb. "Energy Management and Optimization for the Process Industries—Advanced IT Tools for Planning, Monitoring, Controlling, and Reporting Energy System Operations." Published online at [http://library.abb.com/global/scot/scot296.nsf/veritydisplay/bd2a898a24267c46c12571c70070a851/$File/3BFI402000R3001_en_Advanced_IT_Tools_for_Energy_Management.pdf], retrieved Apr. 13, 2009. 6 pages.

Dietmair A, et al., "Energy Consumption Modeling and Optimization for Production Machines". Sustainable energy technologies, 2008. ICSET 2008. IEEE International Conference on IEEE, Piscataway, NJ, USA, Nov. 24, 2008, pp. 574-579, XP031442235, ISBN: 978-1-4244-1887-9.

(56) References Cited

OTHER PUBLICATIONS

European Search Report for European Patent Application No. 10160649.9-1238 dated Sep. 23, 2010, 8 pages.
European Search Report for European Patent Application No. 10160581.4-1238 dated Sep. 23, 2010, 8 pages.
European Search Report for European Patent Application No. 10160673.9-1238 dated Sep. 23, 2010, 9 pages.
Kiritsis D, et al., Research issues on product lifecycle management and information tracking using smart embedded systems. Advanced Engineering Informatics, Elsevier Lnkd—DOI : 10.1016/J. AEI. 2004.09.005, vol. 17, No. 3-4, Jul. 1, 2003, pp. 189-202, XP004595481 ISSN: 1474-0346.
Y-S Ma, et al., Product Lifecycle Analysis and Optimization in an Eco-value Based, Sustainable and Unified Approach. Industrial Informatics, 2006 IEEE International Conference on, IEEE, PI, Aug. 1, 2006, pp. 537-541 XP031003409, ISBN: 978-0-7803-9700-2.
Seref Erkayhan ED-Ding Zhen-Hua et al., The Use of RFID enables a holistic Information Management within Product Lifecycle Management (PLM). RFID Eurasia, 2007 1st Annual, IEEE, PI Sep. 1, 2007, pp. 1-4, XP031153342. ISBN: 978-975-1-5660-1.
European Search Report for European Patent Application No. 10160811.5 dated Sep. 20, 2010, 9 pages.
Kennedy, Pat, et al., "In Pursuit of the Perfect Plant—A Business and Technical Guide", Apr. 2008, Chapter 9—Energy Management, pp. 251-283; published by Evolved Technologist Press, New York, New York, USA.
Kouloura, et al., "A Systems Approach to Corporate Sustainability in Energy Management of Industrial Units", IEEE Systems Journal, vol. 2, No. 4, Dec. 2008, pp. 442-452.
Yang, et al., "Eco-Design for Product Lifecycle Sustainability", IEEE International Conference on Industrial Informatics, 2006, pp. 548-553.
U.S. Appl. No. 13/275,983, filed Oct. 18, 2011, David D. Brandt.
Jawahir, I. S., et al. "Total life-cycle considerations in product design for sustainability: A framework for coomprehensive evaluation." Proc. 10th Int. Research/Expert Conf. (TMT 2006), Barcelona, Spain, 2006.
A.D. Jayal, F. Badurdeen, O.W. Dillon Jr., I.S. Jawahir, Sustainable manufacturing: Modeling and optimization challenges at the product, process and system levels, CIRP Journal of Manufacturing Science and Technology, vol. 2, Issue 3, 2010, pp. 144-152, ISSN 1755-5817.
Dillenburg, Stephen, Timothy Greene, and O. Homer Erekson. "Aproaching socially responsible investment with a comprehensive ratings scheme: total social impact." Journal of Business Ethics 43.3 (2003): 167-177.
Farid Katiraei et al: "Microgrids management", IEEE Power and Energy Magazine, IEEE., Piscataway, NJ, US, vol. 6, No. 3, May 1, 2008, pp. 54-65, XP011214084, ISSN: 1540-7977.

\* cited by examiner

| Products | Electrical Usage KWh | Peak Demand Charges $ | Carbon Dioxide Kg | Nitrogen Oxide Kg | Sulfur Dioxide Kg |
|---|---|---|---|---|---|
| XY123 | 21 | 198.45 | 308.7 | 30.87 | 203.742 |
| XA124 | 37 | 349.65 | 543.9 | 54.39 | 358.974 |
| YY125 | 15 | 141.75 | 220.5 | 22.05 | 145.53 |
| AB126 | 150 | 1417.5 | 2205 | 220.5 | 1455.3 |
| YT127 | 64 | 604.8 | 940.8 | 94.08 | 620.928 |
| XX128 | 96 | 907.2 | 1411.2 | 141.12 | 931.392 |
| AS129 | 87 | 822.15 | 1278.9 | 127.89 | 844.074 |
| XY130 | 75 | 708.75 | 1102.5 | 110.25 | 727.65 |
| NV131 | 38 | 359.1 | 558.6 | 55.86 | 368.676 |

DISCRETE ENERGY ASSIGNMENTS FOR MANUFACTURING SPECIFICATIONS

TECHNICAL FIELD

The claimed subject matter relates generally to industrial control systems and more particularly to monitoring of discrete energy or sustainability factor data and associating such data with a manufacturing component or model such as a bill of material.

BACKGROUND

Energy demand management, also known as demand side management (DSM) and supply side management, includes actions that influence the quantity or patterns of use of energy consumed by end users, such as actions targeting reduction of peak demand during periods when energy-supply systems are constrained. Ideally, energy use would be optimized by supply and demand interactions in the market. For electricity use in particular, the price paid on the market is often regulated or fixed, and in many cases does not reflect the full cost of production. Electricity use can vary dramatically on short and medium time frames, and the pricing system may not reflect the instantaneous cost as additional higher-cost ("peaking") sources are brought on-line. In addition, the capacity or willingness of electricity consumers to adjust to prices by altering demand (elasticity of demand) may be low, particularly over short time frames. In many markets, consumers do not face real-time pricing at all, but pay rates based on average annual costs or other constructed prices.

Various market failures can rule out an ideal result for various management schemes. One is that suppliers' costs do not include all damages and risks of their activities. External costs are incurred by others directly or by damage to the environment, and are known as externalities. One approach to this problem would be to add external costs to the direct costs of the supplier as a tax (internalization of external costs). Another possibility is to intervene on the demand side by some type of rebate. In general, energy demand management activities should bring the demand and supply closer to a perceived optimum.

In general, demand for any commodity can be modified by actions of market players and government (regulation and taxation). Energy demand management implies actions that influence demand for energy. Demand side management was originally adopted in energy, where today Demand-Side Management could be, and in some cases is, applied widely to other utilities including water and gas as well.

Reducing energy demand is contrary to what both energy suppliers and governments have been achieving during most of the modern industrial history. Whereas real prices of various energy forms have been decreasing during most of the industrial era, due to economies of scale and technology, the expectation for the future is the opposite. Previously, it was not unreasonable to promote energy use as more copious and cheaper energy sources could be anticipated in the future or the supplier had installed excess capacity that would be made more profitable by increased consumption. In centrally planned economies, subsidizing energy was one of the main economic development tools. Subsidies to the energy supply industry are still common in some countries. Contrary to the historical situation, energy availability is expected to deteriorate while prices rise. Governments and other public actors, if not the energy suppliers themselves, are tending to employ energy demand measures that will increase the efficiency of energy consumption.

The current economic climate and governmental pressures to reduce energy demands and greenhouse gas emission will force manufacturers to explore energy reductions on the plant floor. Generally, industrial energy consumption is impacted by two major variables—environmental changes and production output. Environmental changes (e.g., air temperature, humidity, time of day, and so forth) on facilities' energy consumption can be measured, trended, and controlled through energy tracking software and building automation systems. Production output's impact on energy consumption is generally estimated and not measured.

Currently, there are no direct incentives on the plant floor to reduce energy consumption since it cannot be measured against production volumes, where energy costs are fixed allocations (generally, cost estimated at per month per square foot). Advances in automation can allow manufactures to make better production decisions based on energy availability, real time pricing, and emission caps but it does not go far enough. Moreover, various products and solutions provide energy and emission management from the facility or macro infrastructure (e.g., substations, switchgears, emission monitors). These tools apply production related information against the overall facility energy data to infer energy performance. Others focus energy and emission management on a building management level e.g., Data Centers, lighting, chiller and boilers.

SUMMARY OF THE INVENTION

The following summary presents a simplified overview to provide a basic understanding of certain aspects described herein. This summary is not an extensive overview nor is it intended to identify critical elements or delineate the scope of the aspects described herein. The sole purpose of this summary is to present some features in a simplified form as a prelude to a more detailed description presented later.

Systems and methods are provided where sustainability factors such as energy are monitored throughout a plant or process and associated with a model such as a bill of material in order to increase plant efficiencies. Automated monitors can receive data from a plurality of sustainability factor data sources that are distributed across an industrial process. Such processes can include discrete processes where automated assemblies occur (e.g., automobile assemblies) or can include batch processes where mixtures of various ingredients are combined to form a recipe or other combination of elements (e.g., chemical process, food process, beverage process, and so forth). As the respective processes are monitored, sources associated with sustainability-factor data such as energy that is collected is tagged to indicate which portion of the discrete or batch process that the source contributed to. After tagging, the data is associated with a manufacturing model such as a bill of material (BOM) for example, where industrial managers or automated processes can then analyze the process for the components of energy that were attributed to the various portions of the respective process. In contrast to prior systems that could only view energy from the overall sense of plant-wide consumptions, the source data that is associated with the BOM can now be analyzed in real-time or via offline modeling to optimize and mitigate energy usage. For example, portions of a process may be rearranged to minimize overall energy usage (e.g., perform step C before step A in order to conserve energy from the reverse order of A and C). It is noted that various models other than BOM models can have associated sustainability factors. Such models include MRP models (material requirement planning), MES models (manufacturing execution system), ERP models (enterprise resource planning), programming models (e.g., ladder logic, SFC, function block), and so forth.

To the accomplishment of the foregoing and related ends, the following description and annexed drawings set forth in detail certain illustrative aspects. These aspects are indicative of but a few of the various ways in which the principles described herein may be employed. Other advantages and novel features may become apparent from the following detailed description when considered in conjunction with the drawings.

DETAILED DESCRIPTION OF THE INVENTION

An industrial control system is provided that automatically associates captured sustainability factor source data such as energy with a manufacturing model such as a bill of material. In one aspect, an industrial control system is provided. The system includes tagged data that is collected from a plurality of sustainability factor sources across an industrial automation environment, where the tagged data is associated with a portion of a process that is attributed to the sustainability factor sources. A manufacturing model is associated with the tagged data, where the manufacturing model is employed to enhance the efficiencies of the process. The process can be associated with a discrete process or a batch process, where the manufacturing model can be a bill of material, an MRP model (material requirement planning), an MES model (manufacturing execution system), an ERP model (enterprise resource planning), or a programming model, for example. The programming model can include ladder logic, a sequential function chart (SFC), a batch program, or a function block, for example.

It is noted that as used in this application, terms such as "component," "module," "source," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process or thread of execution and a component may be localized on one computer or distributed between two or more computers, industrial controllers, or modules communicating therewith.

Figure 1:
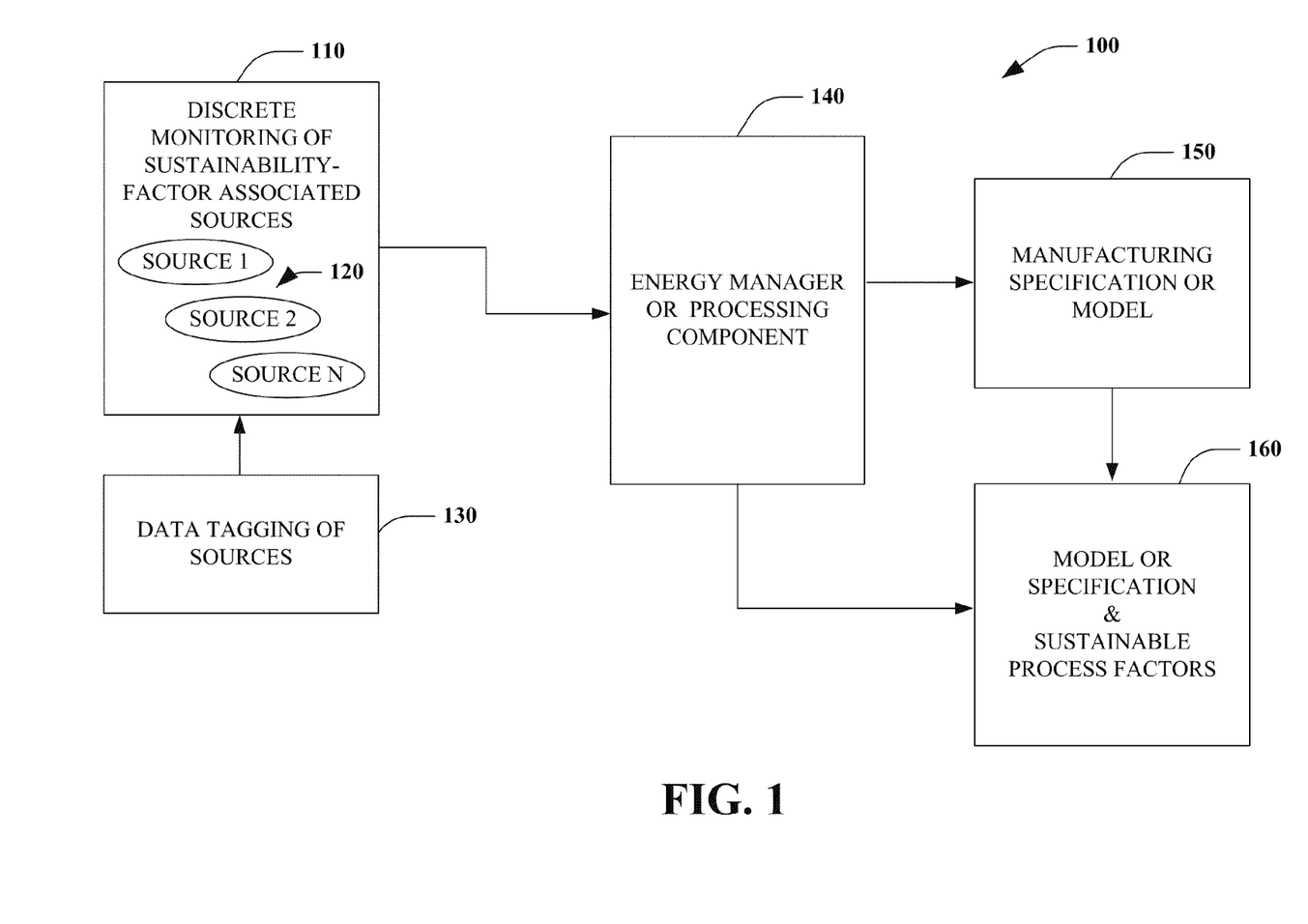
FIG. 1 is a schematic block diagram illustrating a manufacturing model that is associated with sustainability factor source data to enhance the efficiencies of an industrial process.

Referring initially to FIG. 1, a system 100 illustrates illustrating a manufacturing model that is associated with sustainability factor source data to enhance the efficiencies of an industrial process. The system 100 includes a plurality of discrete monitors 110 that are stationed throughout an industrial system or process and are employed to collect data from various sustainability factor sources 120. The sustainability factor sources 120 can be from various portions of a process and related to such factors as energy or waste for example and are described in more detail below with respect to FIG. 2. A tagging component 130 is provided to label or mark the collected source data 120 as to which portion of an industrial process the data is associated with. For example, in a batch process, the source data 120 may be tagged to indicate which pipe or valve a recipe component was transported across and how much energy such pipe or valve consumed as part of the process. From another point of view, the pipe or valve may be attributed to the amount of waste associated with a portion of the batch process and in its own manner, reflect a type of energy or sustainability factor that is attributable to the respective process. In a discrete process, where items may be assembled in a parallel or serial manner, the sources 120 may be tagged to indicate a sustainability factor for the various components of the discrete process (e.g., discrete process A building an engine lists various components of the engine where the tagged data from the sources 120 is associated with the engine components). As shown, an energy manager or processor 140 collects the tagged data and links the tagged data with a manufacturing model 150 to produce a model or specification 160 that includes the discrete or batch process components that have been associated with the respective sustainability factors or source data 120. By associating energy or other sustainability factors with the manufacturing model or specification at 160, various efficiencies can be provided for and managed within the factory since each item's energy/sustainability factor component can now be accounted for and traced as a component of the respective discrete or batch process.

It is noted that in addition to capturing sustainability-factor data according to where the data is captured within a respective process, that other mechanisms can be employed for identifying where the respective data has been generated within the process. For instance, time synchronization procedures can be employed to capture and tag sustainability-factor data that is associated with a given process. This can include information-level correlation of consumption data, using a time stamping methodology such as IEEE 1588, for example. Thus, in addition to capturing data and associating it to a batch or a lot in the controller as described above, sustainability-factor data can be captured as raw data via time stamping routines (e.g., routine that identifies when a procedure occurred and thus identifies where the data originated in the process) and correlating that data in the information space to a batch, lot, process, and so forth through the time stamping process. For example, three processes can be defined as how energy is monitored. For instance, energy monitor X is tied to a drive on a mixer, monitor Y is tied to an oven, and monitor Z is tied to a conveyor. One option would be to store the raw data and let another higher level application (e.g., an energy metric application) link the time stamped data to a batch. Thus, raw data can be evaluated or manipulated when stored according to time stamping procedures.

In another aspect, manufacturing equipment consumes energy when not manufacturing goods (e.g., idle, start up, setup, reconfiguration, and so forth). Original equipment manufactures (OEM) provide operational equipment effectiveness calculations (OEE) as a performance metric but it does not consider energy consumption. With the use of a simple energy efficiency calculation, manufacturers could make more informed decisions on equipment selection, decommission, and so forth. Similar to the miles per gallon standard on a vehicle or the Energy Star cost rating on a water heater. OEMs could differentiate their products from their competition by using this simple calculation. Two packaging machines may meet a rated output of XX units per hour and have similar quality but one could use energy in a less efficient way. The equipment components may be oversized or the control system may be poorly programmed. Ultimately, the equipment is wasting energy. A metric such as Manufacturing energy consumed/Total energy consumed=Percent of efficiency can be provided, for instance. Similarly, a facility level measurement can also be provided (e.g., measured through a rolled-up efficiency calculation).

In general, the system 100 sustainability factors such as energy are monitored throughout a plant or process and associated with the model 150 such as a bill of material in order to increase plant efficiencies. Automated monitors 110 can receive data from a plurality of sustainable sources 120 that are distributed across an industrial process. Such processes can include discrete processes where automated assemblies occur (e.g., packaged assemblies) or can include batch processes where mixtures of various ingredients are combined to form a recipe or other combination of elements (e.g., chemical process, food process, beverage process, and so forth). As the respective processes are monitored at 110, sustainability factor sources 120 such as energy that is collected is tagged at 130 to indicate which portion of the discrete or batch process that the source contributed to. After tagging, the data is associated with the manufacturing model at 160 such as a bill of material (BOM) for example, where industrial managers or automated processes can then analyze the process for the components of energy that were attributed to the various portions of the respective process.

In contrast to prior systems that could only view energy from the overall sense of plant-wide consumptions, the source data that is associated with the BOM (or other model described below) can now be analyzed in real-time or via offline modeling to optimize and mitigate energy usage. For example, portions of a process may be rearranged to minimize overall energy usage (e.g., perform step C before step A in order to conserve energy from the reverse order of A and C). It is noted that various models other than BOM models can have associated sustainability factors. Such models include MRP models (material requirement planning), MES models (manufacturing execution system), ERP models (enterprise resource planning), programming models (e.g., ladder logic, SFC, batch program, function block), and so forth. In general, the system 100 allows extracting energy or other consumption data from the plant floor or other sources of sustainability factor data and correlating it to production output. This enables applying standard production modeling tools for production energy and emission forecasting and optimization, while extending the existing facility demand management system to include production, and lastly, link that system to the Demand Response and Smart Grid (DRSG), as well as, Cap and Trade systems, for example.

It is noted that components associated with the system 100 can include various computer or network components such as servers, clients, controllers, industrial controllers, programmable logic controllers (PLCs), energy monitors, batch controllers or servers, distributed control systems (DCS), communications modules, mobile computers, wireless components, control components and so forth that are capable of interacting across a network. Similarly, the term controller or PLC as used herein can include functionality that can be shared across multiple components, systems, or networks. For example, one or more controllers can communicate and cooperate with various network devices across the network. This can include substantially any type of control, communications module, computer, I/O device, sensors, Human Machine Interface (HMI) that communicate via the network that includes control, automation, or public networks. The controller can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware or software components). These include components such as switches with virtual local area network (VLAN) capability, LANs, WANs, proxies, gateways, routers, firewalls, virtual private network (VPN) devices, servers, clients, computers, configuration tools, monitoring tools, or other devices.

It is further noted that the energy manager or processing component 140 is typically a server or computer system such as a batch server for industrial control systems. This can include processing components of a recipe that are subsequently executed by the processing or manager component 140, where the recipe identifies what aspects of a process are employed to produce a given recipe. In one example, an S88 standard provides models that define equipment control, procedure control, and activity. One aspect to implementing this and other standards is creating the ability to separate recipe development from equipment control through the use of an equipment module (not shown) that includes both actual equipment (e.g., tanks, pumps, etc.) and a software representation of the same hardware that includes all the process capabilities. For a given grouping of equipment, each process task is typically designated as a phase against that equipment module. Moreover, the S88 model can function as the manufacturing model 150 in one example for a respective model.

The model can include a process unit that can be broken down into its equipment modules, which represent all the possible tasks for that grouping, where the respective groupings can be associated with sustainability factor source data 120 that has been aggregated and tagged from across the factory or other facilities. Each unit can represent an organization of code in the controller designed by the process engineers that performs a task each time it is called. Each equipment module is also designed to accept one or more parameters. With material addition for example, two parameters specify which material to add and how much. Under the S88 standard, this represents the equipment model. The next step in the S88 standard is the procedural model, where the process engineer maps which equipment modules to call, in what order. This map is called an operation under the standard. For example, the process engineer creates a procedure that supports the ability first to purge the unit, add two materials, mix, react, and then transfer out. This becomes the foundation of a recipe template which can be common to different products, but differentiated by the parameters for each phase. Under this model, the parameters or formulation can be managed independently of operation templates. The process engineers create a family of templates to cover multiple arrangements of equipment usage. The formulators then create parameter sets. At runtime, the proper operation can be matched up with the proper formula set to create an S88 control recipe that can be executed against the equipment. It is to be appreciated procedural models other than S88 can also be employed. Thus, each component of the S88 model can be mapped and associated with a collected piece of sustainable source data 120 and ultimately generated as a model or specification that is tagged at 160 with the items of collected source data. In another aspect, an industrial control system is provided. The system includes means for monitoring (component 110) one or more sustainability factor-associated energy sources. This includes means for identifying (component 130) the sustainability factor-associated energy sources; and means for generating a manufacturing specification (component 140) that reflects at least one sustainability-factor associated energy source.

Figure 2:
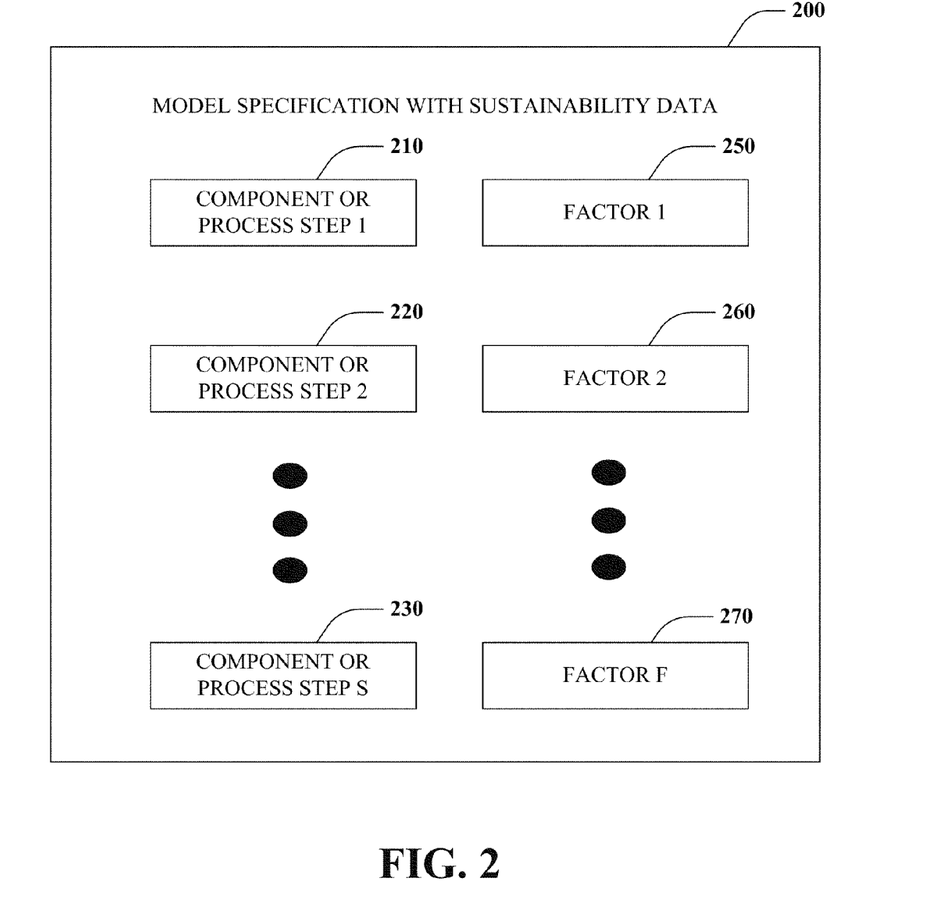
FIG. 2 is a diagram illustrating a model specification that has been associated with sustainability factors.

Turning now to FIG. 2, a model specification 200 is provided that has been associated with sustainability factors. The specification 200 includes one or more components or process steps 210-230, where components may typically relate to a discrete manufacturing process and process steps relate to a batch manufacturing process. Some specifications 200 may include a hybrid where discrete processes and batch process are identified on the same specification. In addition to the component or process steps 210-230, the specification 200 includes one or more sustainability factors 250-270. Such factors 250-270 may be associated with a singular component or process step or a single factor can be associated with a subset of component or process steps. Example sustainability factors 250-270 can include energy or waste factors or include other factors such as illustrated in the example table below:

| Example Sustainability Factors | | |
|---|---|---|
| Planet | People | Profit |
| Water usage | Diversity factors (employment of minorities etc.) for the employer | Utilities costs, including demand charges |
| Expected lifetime energy use of the product | | Marketing/end user appeal (e.g., package design A tested better than package design B and is expected to be more profitable) |
| Expected energy use of the process | "Training" score - skilled vs. unskilled labor | |
| TYPE of energy used for manufacturing (solar, wind, nuclear, etc) | Use of union vs. non-union labor | |
| Carbon emissions | Fair labor practices | Any financial measurement impacting the cost or profitability of a product or service |
| "Recyclability", e.g., of packaging | LWDCR: Lost Work Day Case Rate (Work related injuries and illnesses that result in the employee not being able to perform work; cases per 100 employees) | |
| "Waste" factor (for product and process) | | |
| Any other factor which relates to the environmental impact of a product or process | | |
| | LWDR: Lost Work Day Rate (Measure of severity by accounting for the number of days lost due to work related injuries and illnesses; cases per 100 employees) | |
| | RCR: Recordable Case Rate (Recordable cases includes any work related injury or illness above a first aid) | |
| | Any other factor which relates to the safety performance of a product, machine, process, organization, etc. | |

Figure 3:
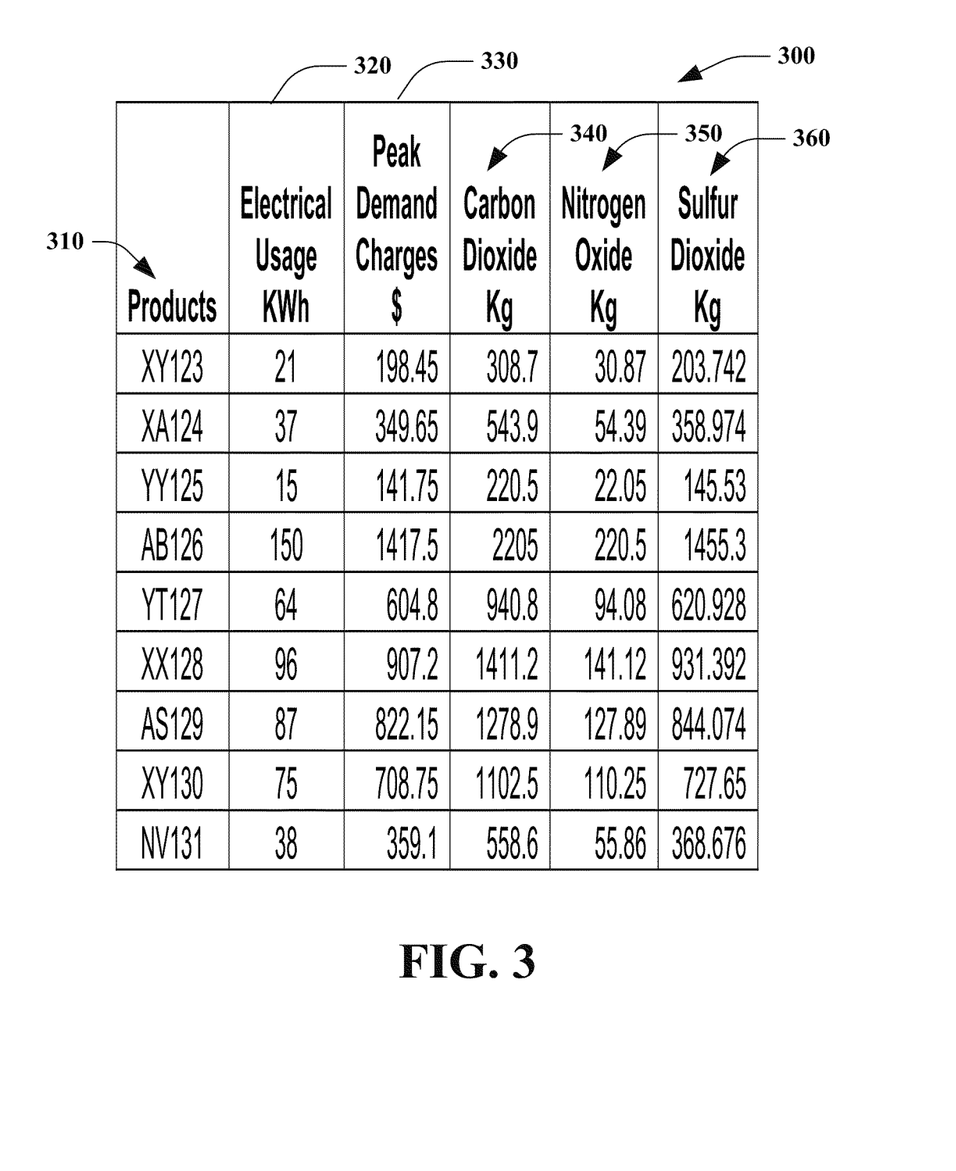
FIG. 3 is a diagram illustrating an example bill of material having associated sustainability factors.

In some cases, the product itself may be associated with a factor as illustrated in FIG. 3, where various products outlined in an example bill of material 300 in a left column 310 are associated with example sustainability factors such as electrical usage 320, peak demand 330, carbon dioxide 340, nitrogen oxide 350, and sulfur dioxide 360. Every day manufactures make scheduling decisions based on the availability of materials and high cost of labor. As energy prices rise, they will need to add energy to their scheduling decisions. Today, the wrong scheduling choices are costing producers tens, if not hundreds, of thousands of dollars in demand penalties and tariffs. Some penalties stay in place for upwards of 12 months.

Automated production lines can monitor some level of energy usage for startup profiles, maintaining recipe optimization, or for regulatory compliance. Manufacturers could, by applying various monitoring components, have the ability to make scheduling, forecasting and optimizing choices against energy demands through the use of standard production simulation tools. They could manipulate schedules to move orders that consume large amounts of energy to off peak pricing (load leveling). Also, in areas where energy has been de-regulated, manufactures will be able to make wiser choices based on manufacturing schedules.

Energy monitoring on the production floor can be tied to an energy tracking software package and correlate production output to the energy consumed. Energy could be metered and the empirical results could be added to the production Bill of Material (BOM). This allows the use of standard production simulation and forecasting tools, as well as, lean six sigma tools to optimize production against additional variables such as energy, rate schedules, and emissions. FIG. 3 shows an example of electricity data at 310 and 320 extracted from the BOM 300.

Production process simulations performed to analyze labor could be adjusted to analyze energy consumption just by exchanging KWh for minutes, for example. Empirical energy data could be used to optimize energy consumed against products per hour. Lean tools such as value stream mapping could mitigate not just labor waste but energy waste in a manufacturing process. Higher output generally has a negative impact on energy consumption.

Production tools for material forecasting can be used for energy forecasting when energy is added to the BOM 300. Manufacturing can forecast demands on infrastructure such as compressed air, steam, electricity, natural gas, and water, for example. Rates with utility brokers in unregulated areas could be negotiated more accurately. Production emission rates can be calculated and applied to the BOM 300. Again, allowing standard production forecasting tools to forecast emission against Cap and Trade regulations, for example. Energy information on the BOM 300 can aid in prioritizing production schedules to load level demand. Adjusting schedules based on peak demand times can reduce the overall cost of energy consumed.

Figure 4:
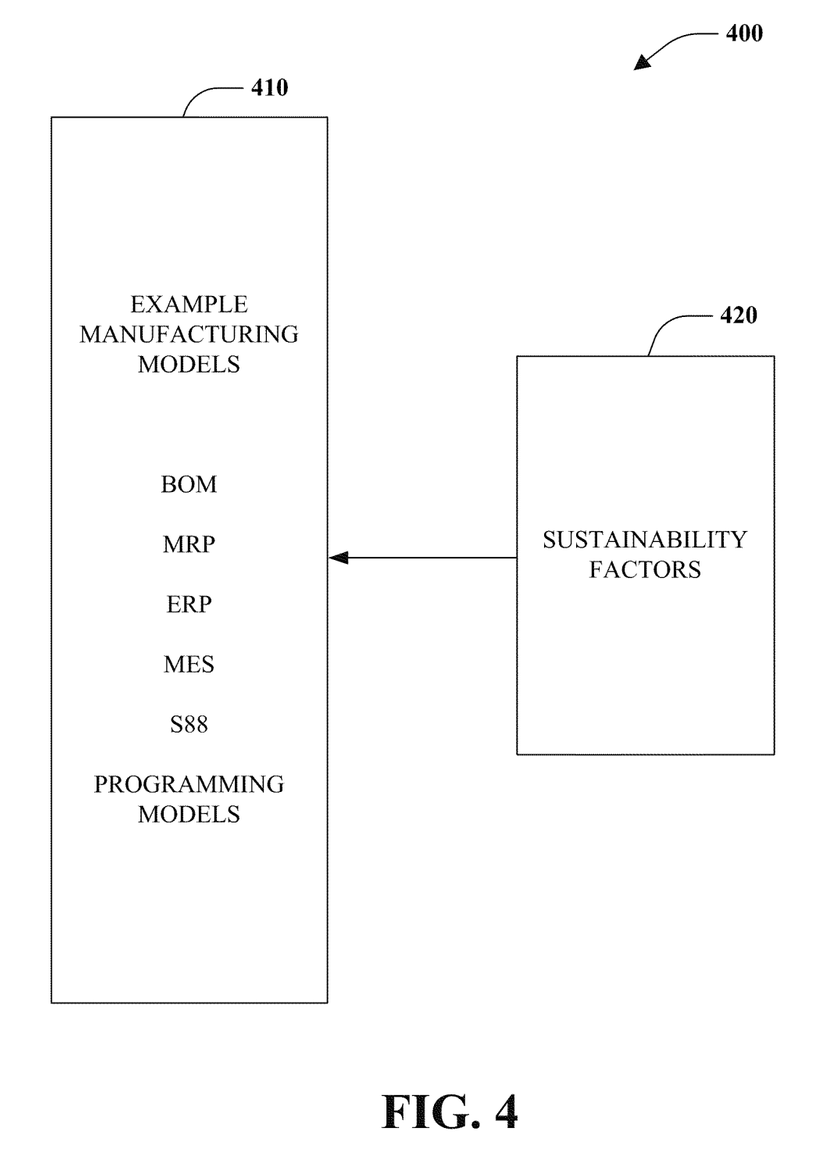
FIG. 4 is a diagram illustrating example manufacturing models that can be associated with sustainability factors.

Referring now to FIG. 4, a system 400 illustrates example manufacturing models 410 that can be associated with sustainability factors 420. As noted previously, the models 410 can include a bill of material (BOM). Other items that can include sustainability factors include but are not limited to user rights, work instructions, schedule data, material specifications (e.g., a system-generated intra-material specification that includes the sustainability factor data), and 'routings' and could also be modified to optimize for sustainability factors. Another model 410 can include a material reservation system model (MRP). In general, an MRP system ensures materials and products are available for production and delivery to customers. This includes maintaining the lowest possible level of inventory along with planning manufacturing activities, delivery schedules and purchasing activities. Thus, any type of specification that is generated by the MRP system can be associated with the sustainability factors 420. Another type of model includes an enterprise resource and planning system (ERP). Enterprise resource planning (ERP) is a company-wide computer software system used to manage and coordinate resources, information, and functions of a business from shared data stores. An ERP system has a service-oriented architecture with modular hardware and software units or "services" that communicate on a local area network. The modular design allows a business to add or reconfigure modules while preserving data integrity in a shared database that may be centralized or distributed. Still yet another model includes a manufacturing execution system (MES). A manufacturing execution system (MES) is a control system for managing and monitoring work-in-process on a factory floor. An MES tracks manufacturing information in real time, receiving up-to-the-minute data from robots, machine monitors and employees. As noted previously, another type of model 410 that can be employed includes an S88 type model. Still yet other models for associating with sustainability factors include programming models which can include ladder programs, SFC programs, functions block programs, and other control programs, for example.

Figure 5:
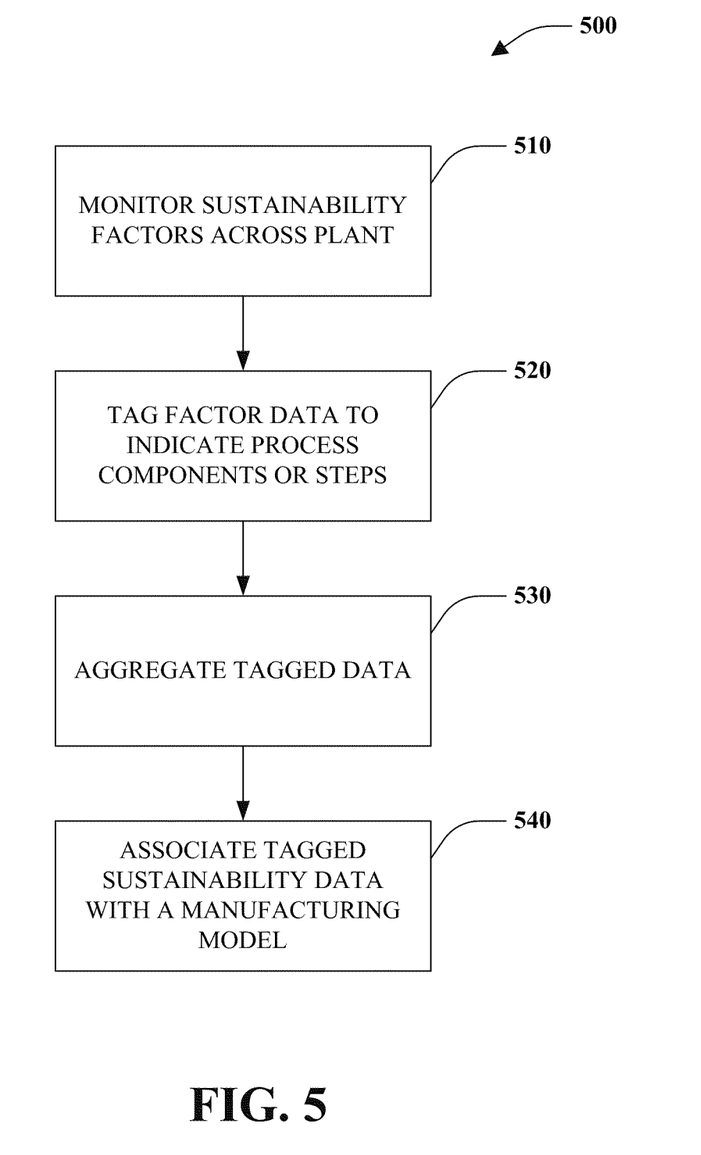
FIG. 5 is a flow diagram illustrating a method for associating sustainability factors with a manufacturing specifications or models.

FIG. 5 is a flow diagram illustrating a method 500 for associating sustainability factors with a manufacturing specifications or models. While, for purposes of simplicity of explanation, the methodology is shown and described as a series of acts, it is to be understood and appreciated that the methodologies are not limited by the order of acts, as some acts may occur in different orders or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 510, various sustainability factors are monitored across a factory or plant floor. Such factors can include energy or waste produced by the plant but can include other factors such as motors usage, pipe usage, valve openings and closings, conveyor usage, inventory assignments where the assignments reflect some type of energy or other sustainability factor, and so forth. At 520, the monitored factor data of 510 is tagged to indicate which portion of a production process or product that the sustainability factor is associated with or linked to. Such tagging can include data labels or memory metadata assignments that indicate which portion of the process (discrete or batch) that the sustainability factor is tied to. At 530, the tagged sustainability data is aggregated. Such aggregation can be performed by a processor or energy manager that collects the data from across the plant or across various facilities via a network connection. When collected, the respective data can be associated with a respective manufacturing specification or model at 540. Such specifications can be generated by an MRP system, an MES system, an ERP system, an S88 model, bill of material, or other programming model as noted previously. After the specification has been updated with the sustainability data, other tools such as optimizers, schedulers, simulators, and so forth can analyze the specification to determine where energy or other factors can be minimized or optimized.

Figure 6:
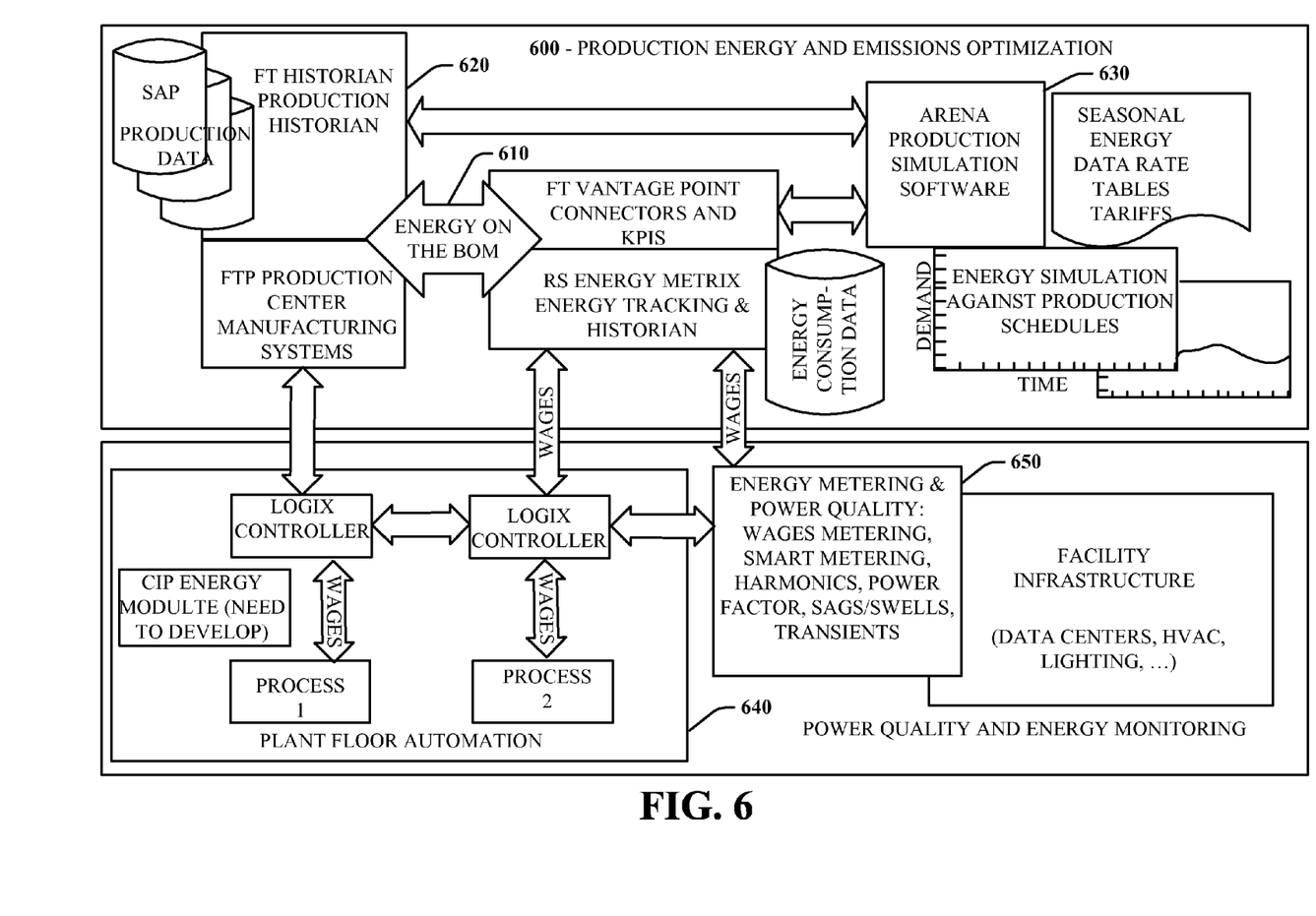
FIGS. 6-8 illustrate example systems that can employ bill of materials having associated sustainability factors.
Figure 7:
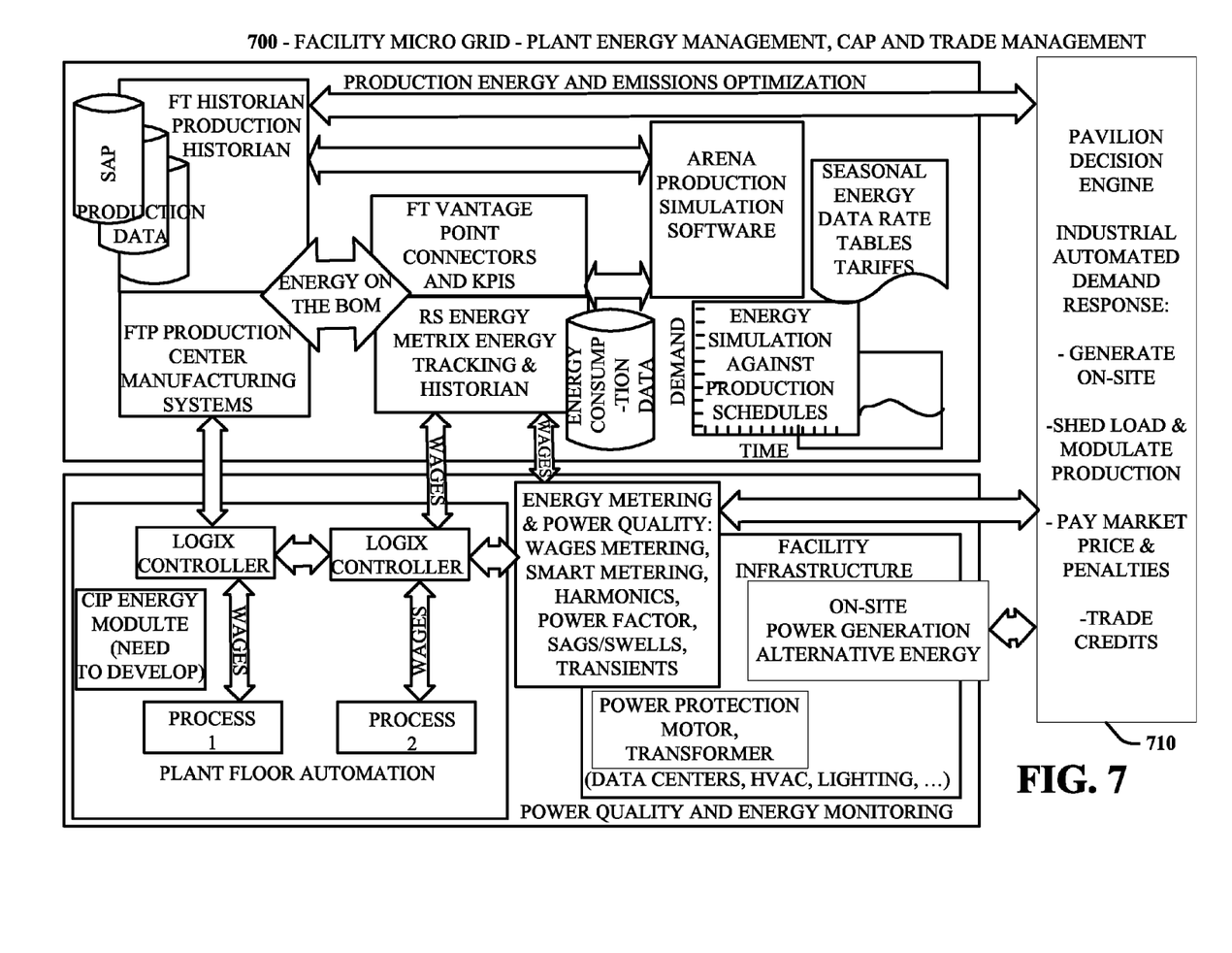
Figure 8:
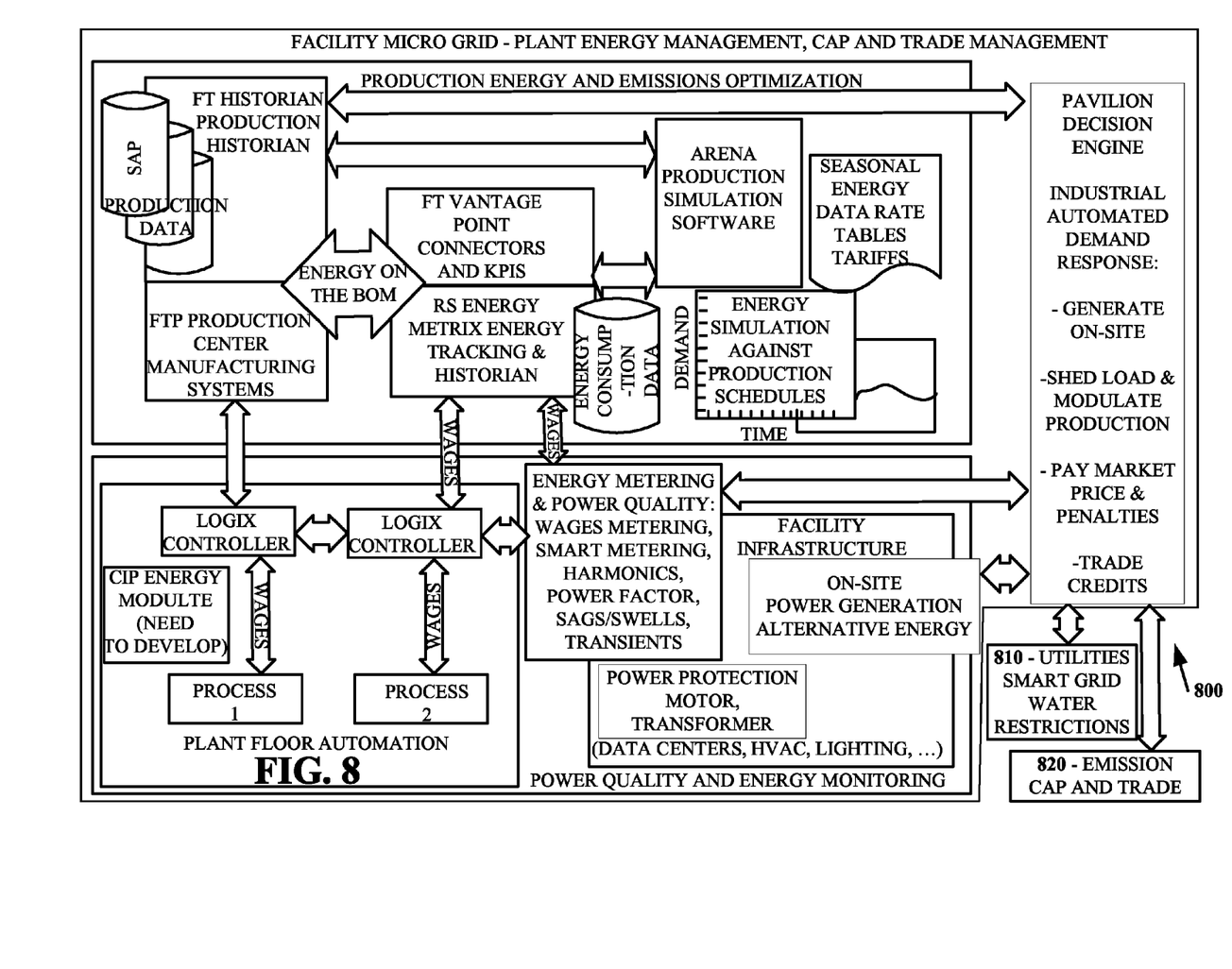

FIGS. 6-8 illustrate example systems that can employ bills of materials having associated sustainability factors. These figures are collectively described in the following description. Referring initially to FIG. 6, a system 600 processes energy or other sustainability factors from a bill of material at 610. The system 600 can include a historian component 620 for archiving process data, a simulation component 630 to determine energy efficiencies that may be derived from the BOM, automation components 640, and energy monitoring components 650. A system 700 of FIG. 7, includes substantially similar components as the system 600 but also includes an industrial automated demand response component 710. A system 800 in FIG. 8, in addition to the components of FIG. 7 includes communications with a smart grid component 810 and an emission cap & trade component 820.

A typical electrical utility bill has a component for consumption, kilowatt-hours, and demand, average power over a pre-defined interval. The consumption charge is computed by multiplying the consumption amount by the applicable rate per KW-H. The rate can be constant or it can change based on the time of day, day of week, season, or current rate available in a de-regulated market. A user can achieve consumption cost saving by improving the efficiency of his system and by shifting usage into a time period with a lower rate per KW-H. Demand charge calculation methods vary from utility to utility, but they are almost all based on measuring the average power over an interval, typically 15 or 30 minutes. In some instances, the utility provides a signal to indicate the end/start of a discrete interval, and in some instances the interval is a continuously rolling window. The maximum recorded demand is then used to set the demand charge. The charge may apply only for the month in which it was incurred, or it could apply for considerably longer, perhaps the next 12 months. Controlling demand charges is a more complicated process. It involves setting a peak demand limit that the user desires to stay below. The actual demand is then measured in real-time. The measured demand is used to project what the average power will be at the end of the time interval. If the projected demand equals or exceeds the user defined peak demand limit, action is required. The action could be as simple as manually turning off one or more loads until the next interval begins, or it could involve an automated process. An automated process is usually chosen since it can continuously monitor the situation and react quickly without intervention. The process usually involves identifying various loads that can be shut down for a short time and prioritizing them. The automated system will then shed loads starting with the lowest priority load until the projected demand is below the limit. When a new interval begins, the automated system can re-apply the loads, typically in reverse order, to allow normal system operation. In an industrial facility the production equipment is usually not considered a shed-able load since this would disrupt the manufacturing process. Most often selected loads involve thermal storage such as HVAC or refrigeration, energy storage such as air compressors, or lighting loads.

This strategy can successfully reduce a facility's electric bill, but it does not go far enough. The approach assumes that the supply of electricity is unlimited up to the capacity of the connected electrical distribution equipment and it does nothing to help optimize the cost per unit for the products being produced. To improve this method additional, metering of the system can be employed as previously described and show at 650 of FIG. 6. The additional metering should provide enough granularities for the user to measure the energy used by various elements within his process or manufacturing system under a variety of operating conditions. With this information and the applicable utility rate structure, the user can now construct a more complete breakdown of the true cost per unit for the output of the facility. It is now possible to construct a mathematical model that includes cost of raw materials, amortization of capital equipment, floor space, labor, prioritized production requirements, and energy. The output of the model allows control choices to be made that manage output requirements and energy usage while also optimizing the economic return to the company. For example, a demand response component can be provided that employs a mathematical model to modulate a manufacturing process based upon at least one of business rules, regulatory restrictions, or energy availability.

The availability of the energy requirement profile for various components of the manufacturing line or process also enables an enhancement to the control process. As stated above, the typical method for controlling energy costs is simply turning on or off various portions of a facility. However, in many cases there is another alternative that may be more desirable. Instead of viewing the controllable elements as being either on or off, they can be controlled to operate along the continuum between those two states. In other words, the production line or process can be "modulated" based on the mathematical model. Consider that the facility produces a product that must be heated in an oven for a specific amount of time in order to cure or cook the product. In previous systems, when the cost or availability of energy was not a significant concern, the system would be designed to produce the most finished product possible in the least amount of time while maintaining acceptable quality. This usually provided the best return for the cost expended. In the current higher cost of energy environment this may no longer be true. It may now be a better economic decision to reduce the temperature in the oven and increase the time when the cost of energy is higher. This modulation of the system produces fewer products per unit of time. However, if properly driven by the mathematical model the return on investment can be maximized.

The system 700 of FIG. 7, illustrates an architecture for facility energy and emission management. The energy supply environment is changing rapidly. One of the approaching changes will be the emergence of the "smart grid." This is an enhancement to the utility electrical distribution process that allows rapid two-way communication between utilities and between utilities and consumers. The intention of the smart grid is to increase efficiency, increase reliability, reduce the energy consumed to produce the electricity, and reduce the associated emissions. Part of this process will be Automated Demand Response at 710. Automated Demand Response enables users of the supplied energy to react to the available supply in real time. The facility may be instructed by the smart grid that it will need to reduce consumption to a certain level or by a specific percentage. Sufficient advance notice would be provided to allow the facility to make appropriate adjustments. The user will be charged a lower rate as an incentive. The production mathematical model can use this scenario as another input to the model. The "modulation" concept can be applied here also to implement the required level of production while still ensuring the best economic return. The concept of modulating the production process also keeps workers active, at a reduced rate, instead of idling them when equipment is shut down. FIG. 8 shows the system 800 for extending the facility Micro Grid to include outside information from demand response smart grid and cap and trade, for example.

Figure 9:
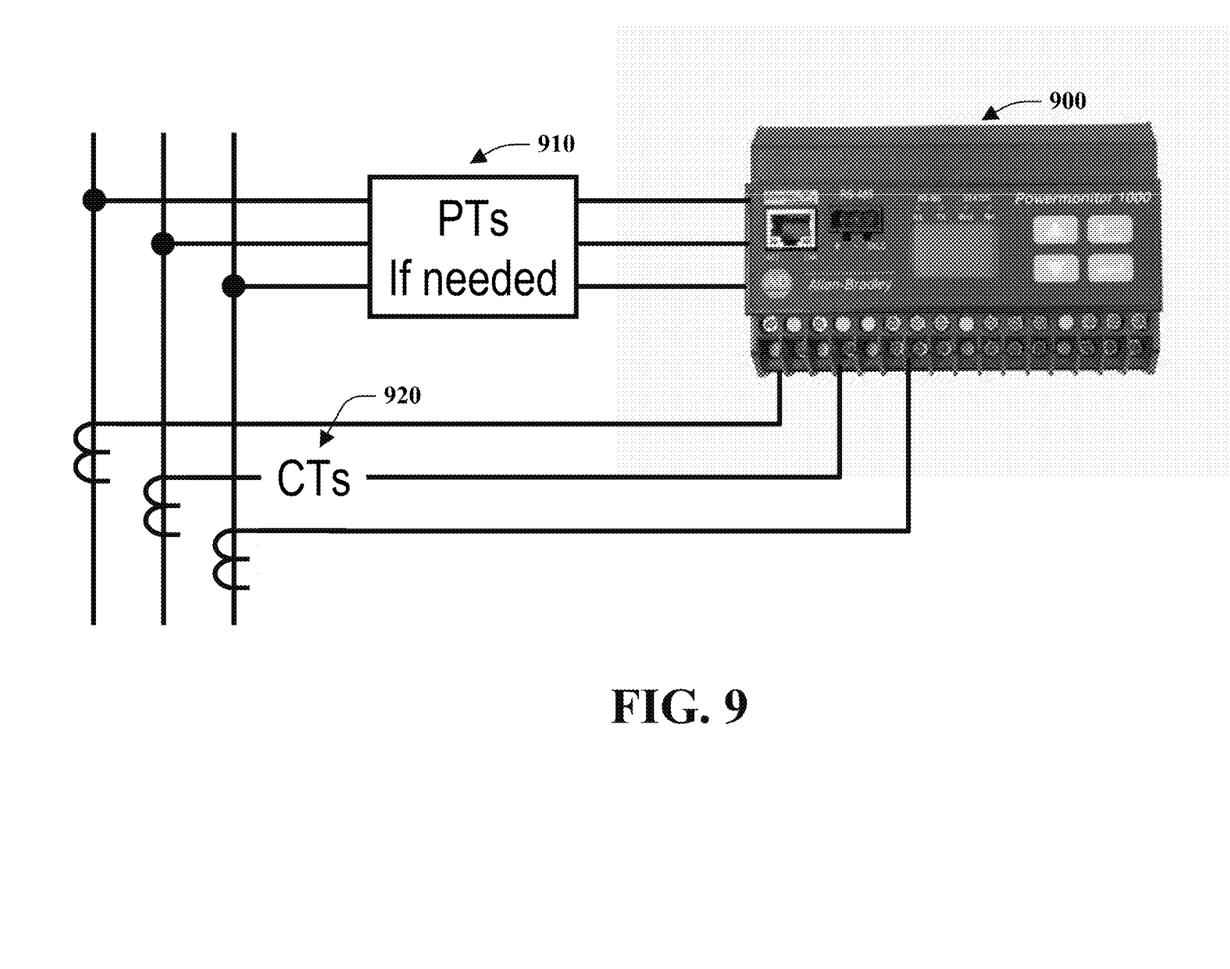
FIG. 9 is a diagram illustrating an energy monitoring component.

FIG. 9 illustrates an example energy monitoring component 900. Energy monitoring components 900 can come in various packages and be designed to monitor a plurality of different sustainability factors. In this example the monitor 900 is monitoring potential transformers 910 or current transformers 920 for energy usage in a process. Monitoring components can include smart devices that can monitor and tag energy data as it is employed in various parts of a process. Such data could be collected and tagged in a device network for example before being transferred to some high level network such as a control network or an Ethernet/Internet, for example.

Figure 10:
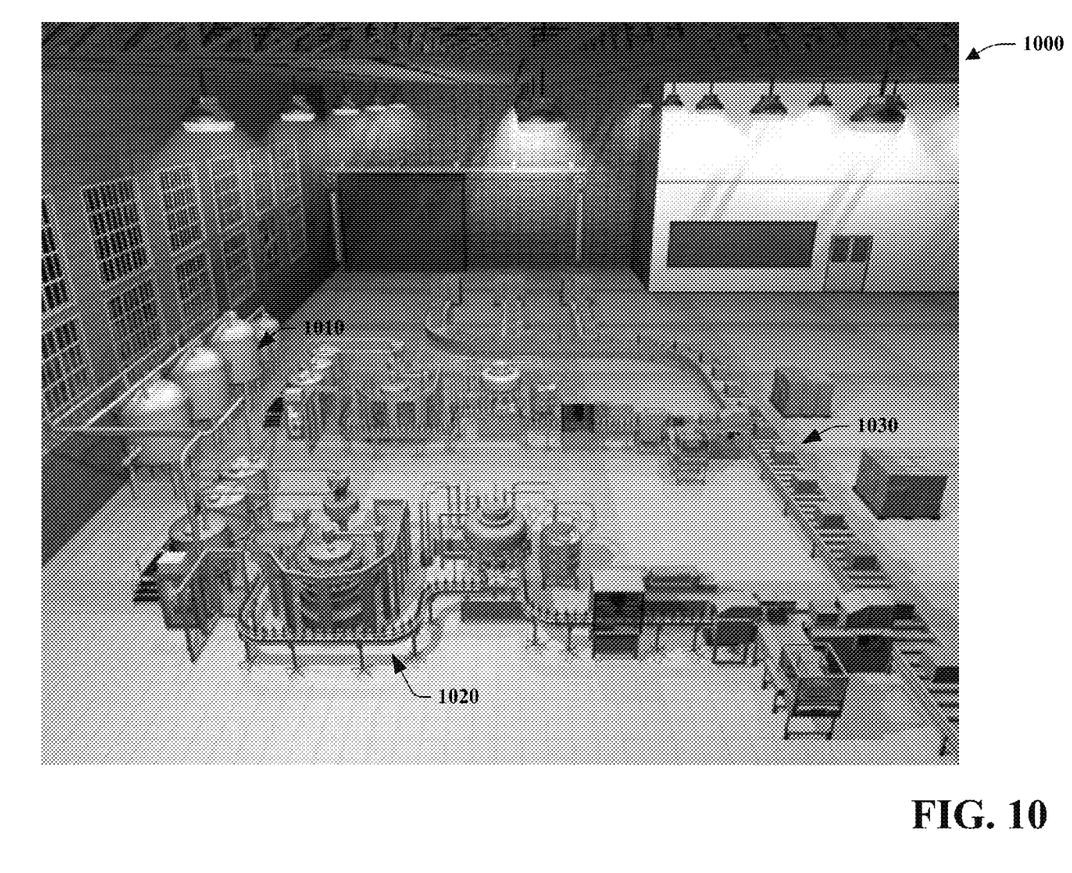
FIG. 10 is a diagram illustrating an example process factory that can be monitored for sustainability factors.

FIG. 10 illustrates an example process factory 1000 that can be monitored for sustainability factors. The factory 1000 is a hybrid process that includes batch processes such as batch mixtures contained in vessels shown at 1010. Such mixtures can be bottled as part of a discrete process 1020 that is then packaged across a conveyor line at 1030. The respective vessels 1010 can have inlet and outlet piping that can be monitored for energy consumption or waste by products. The various bottling or other discrete processes (e.g., bottle capping) can be monitored for energy usage. This includes monitoring motors that move the lines and conveyors, valves, robots, pick and place equipment, assembly equipment, drilling equipment, labeling equipment, and so forth. A plurality of locations and/or components can be monitored across the factory 1000 to generate desired sustainability factor or energy data that can then be associated with the manufacturing models or specifications described above.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial control system, comprising:
  a plurality of discrete monitors configured to acquire a plurality of datasets associated with a plurality of sustainability factors regarding one or more processes within an industrial automation environment, wherein the plurality of sustainability factors comprises energy information and waste information;
  a processor configured to:
    generate a plurality of tagged datasets based on the plurality of datasets and an association between each of the plurality of datasets with a respective process of the one or more processes;
    aggregate the plurality of tagged datasets with respect to the respective process of the one or more processes to generate a plurality of aggregated datasets; and
    generate a manufacturing model configured to enhance one or more energy efficiencies of the one or more processes, wherein the manufacturing model comprises an association between each of the plurality of aggregated datasets and the respective process of the one or more processes; and modifying one or more operation schedules of the one or more processes based on the manufacturing model.

2. The system of claim 1, wherein the one or more processes are associated with a discrete process or a batch process.

3. The system of claim 1, wherein the manufacturing model is a bill of material, an MRP model (material requirement planning), an MES model (manufacturing execution system), an ERP model (enterprise resource planning), an S88 model, or a programming model.

4. The system of claim 3, wherein the programming model includes ladder logic, a sequential function chart, a batch program, or a function block.

5. The system of claim 3, wherein the bill of material includes itemized components of the plurality of sustainability factors regarding the one or more processes that are associated with one or more components of a discrete assembly or steps of a batch process.

6. The system of claim 3, wherein the bill of material includes itemized components of the plurality of sustainability factors regarding the one or more processes that are associated with a subset of discrete components or a subset of batch process steps.

7. The system of claim 3, wherein the bill of material includes itemized components of the plurality of sustainability factors associated with a product listing.

8. The system of claim 7, wherein the bill of material includes a peak demand listing or an electrical usage charge.

9. The system of claim 7, wherein the bill of material includes the waste information.

10. The system of claim 1, wherein the plurality of sustainability factors comprises water usage, expected energy use, a type of energy used, a carbon emission, a recyclability factor, an environmental impact factor, a safety factor, or a utility demand factor.

11. The system of claim 1, further comprising a smart grid component that processes the manufacturing model.

12. The system of claim 1, further comprising a demand response component that employs a mathematical model to modulate a manufacturing process based upon at least one of business rules, regulatory restrictions, or energy availability.

13. The system of claim 1, further comprising a historian component to archive data associated with the plurality of sustainability factors.

14. The system of claim 1, further comprising a simulation component to manage energy in accordance with the manufacturing model.

15. The system of claim 1, wherein the plurality of sustainability factors is associated with user rights, work instructions, schedules, material specifications, an intra-material item specification, or routings.

16. The system of claim 1, wherein the plurality of sustainability factors is captured in accordance with a time synchronization procedure.

17. The system of claim 16, wherein the time synchronization procedure is associated with a 1588 standard.

18. The system of claim 1, wherein the manufacturing model determines a percent of efficiency as a ratio of manufacturing energy consumed and total energy consumed.

19. A method of controlling an industrial process, comprising:

receiving a plurality of datasets from a plurality of energy sources across an automated facility, wherein the plurality of datasets comprise energy information and waste information associated with one or more portions of a process in the automated facility;

generating a plurality of tagged datasets based on an association between the plurality of datasets and a respective portion of the process;

aggregating the plurality of tagged datasets with respect to the respective portion of the process to generate a plurality of aggregated datasets;

adapting a manufacturing specification to record an association between each of the plurality of aggregated datasets and the respective portion of the process; and processing the manufacturing specification to mitigate energy associated with the automated facility by altering an operation schedule of the respective portion of the process.

20. The method of claim 19, further comprising adjusting an energy grid in view of the plurality of tagged datasets.

21. The method of claim 19, further comprising generating a bill of material from the manufacturing specification, wherein the bill of material includes: itemized energy consumption data associated with one or more components or one or more process steps of the process, or itemized energy consumption data associated with a products produced by the process.

22. The method of claim 21, further comprising monitoring waste or emissions to update the bill of material.

23. The method of claim 21, further comprising processing the bill of material in a simulator to determine energy savings.

24. An industrial control system, comprising:

means for monitoring one or more sustainability factor-associated energy sources;

means for identifying the sustainability factor-associated energy sources;

means for generating a manufacturing specification that reflects at least one sustainability factor-associated energy source; and means for generating a bill of material from the manufacturing specification, wherein the bill of material includes itemized components of sustainability factors associated with components of a process or products produced by the process, wherein the sustainability factors comprise energy information and waste information.

* * * * *